United States Patent
Conrad et al.

[15] 3,664,181
[45] May 23, 1972

[54] FLOOR STRUCTURE FOR A TEST CHAMBER

[72] Inventors: Charles F. Conrad; Kieth L. Dadd, both of Holland, Mich.

[73] Assignee: Thermotron Corporation, Inc., Holland, Mich.

[22] Filed: July 25, 1968

[21] Appl. No.: 747,555

[52] U.S. Cl. .................................................73/71.6, 73/432
[51] Int. Cl. .............................................................G01n 29/00
[58] Field of Search ................73/71.5, 71.6, 71.7, 432 SM, 73/150, 460, 15

[56] References Cited

UNITED STATES PATENTS

| 3,049,913 | 8/1962 | Hunt | 73/71.6 |
| 3,121,335 | 2/1964 | Ongaro | 73/460 |
| 3,241,358 | 3/1966 | Booth et al. | 73/71.6 |

OTHER PUBLICATIONS

David, B. R., " Furnace on a Shaker," M. B. Vibrations Notebook, Vol. 9, No. 4, Dec., 1963, pp 1–4
Fairchild, Space Environments Laboratory Publication, Received at Patent Office Sept. 27, 1963, pp. 4–6, 36

*Primary Examiner*—Richard C. Queisser
*Assistant Examiner*—Arthur E. Korkosz
*Attorney*—Glenn B. Morse

[57] ABSTRACT

A test chamber having a floor including a flexible sealing diaphragm secured to a frame removable and insertable laterally through an open door together with an exterior vibrating unit adapted to transmit vibrations through the diaphragm.

10 Claims, 6 Drawing Figures

INVENTORS
Charles F. Conrad
BY Kieth L. Dadd

ATTORNEY

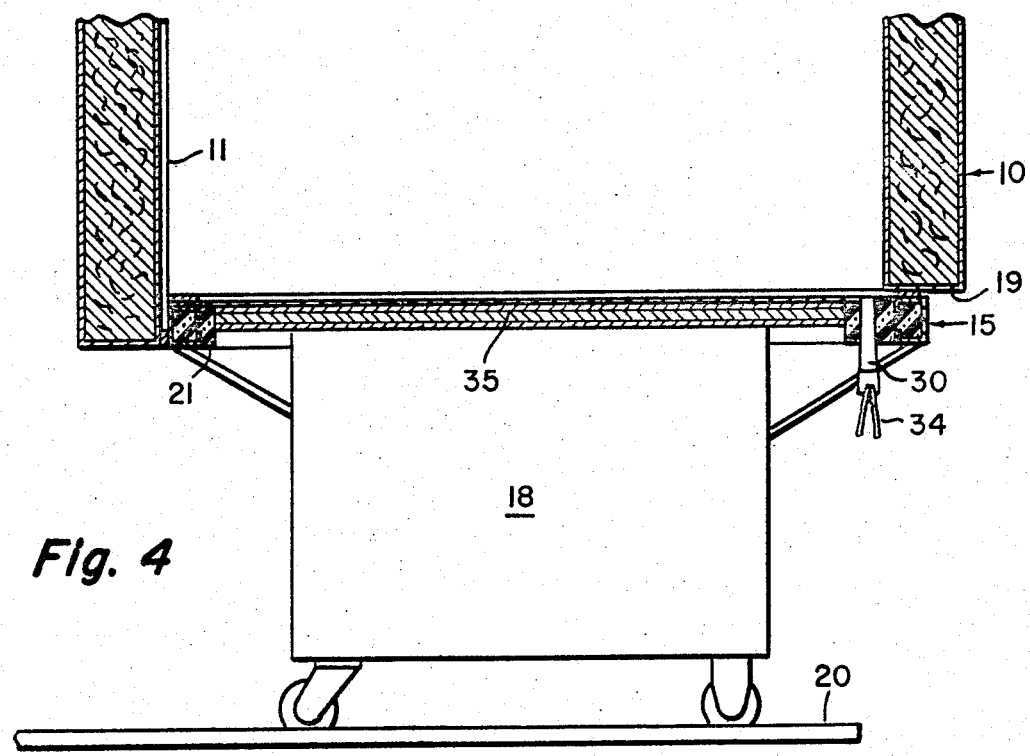
Fig. 4
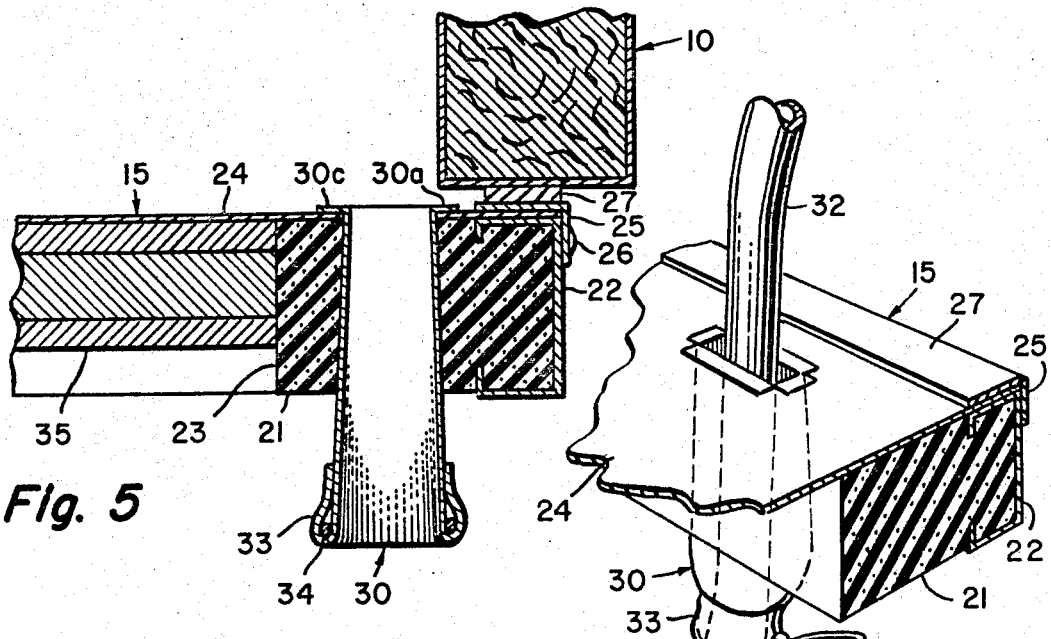
Fig. 5   Fig. 6
INVENTORS
Charles F. Conrad
Kieth L. Dadd
BY
ATTORNEY

FLOOR STRUCTURE FOR A TEST CHAMBER

BACKGROUND

Test chambers have come into very wide use in recent years in the course of the development of instruments and equipment installed in a high-altitude aircraft and space vehicles. This equipment necessarily must function properly in an environment including very low air pressure, extremes of temperature, and conditions of severe vibration. A sealed chamber of relatively conventional construction can easily be equipped to provide the extremes of temperature and atmospheric pressure, or can provide any other sort of gaseous environment that may be desired. A problem is encountered, however, when a vibration program is added. If the vibration generator is included within the chamber, the size of the chamber becomes prohibitive. The design of the vibrating equipment must also accommodate the very extremes of environment that are being produced in the test chamber. Both of these factors contribute to a technical problem as well as a problem in economics.

Arrangements have been tried for positioning the vibration generator exteriorly of the sealed test chamber, with provision for the transmission of vibrations through some portion of the walls of the chamber. Various developments in this direction have been noted in the following references:

| Reference | Patent No. | Date |
| --- | --- | --- |
| MB Vibrations Notebook Volume 2, No. 1, Pages 7–9 | | 1956 |
| Thompson-Houston (French) | 1,239,193 | 1960 |
| Hunt (United States) | 3,049,913 | 1962 |
| Taccogna (United States) | 3,142,172 | 1964 |
| Booth et al. (United States) | 3,241,358 | 1966 |

SUMMARY OF THE INVENTION

The floor structure provided by the present invention permits a test set-up to be completed exteriorly of the test chamber, with the floor unit resting on top of a conventional vibration generator. The entire unit may then be moved horizontally into position in the chamber, which involves the engagement of the floor unit with appropriate guideway structure on the test chamber. The open door of the test chamber, in the preferred form of the invention, exposes the entrance to the guideways. Once the unit is moved into position, the closing of the door can generate a sealing engagement between the door and the floor unit. Preferably, the floor structure is clamped upwardly against the test chamber on a gasket to improve the seal around the periphery.

The disengageable floor of the test chamber is defined by a frame preferably constructed of foamed plastic insulating material overlayed by a flexible diaphragm seal capable of transmitting vibrations with a minimum of transmission over to the structure of the frame and the chamber walls. The vapor-tight sheet of flexible material constituting the diaphragm can be fiberglass cloth impregnated with silicone rubber, or other materials having similar characteristics. It is often preferable to use a flexible laminated sheet combining the effects of a vapor-tight seal with some degree of insulation. The insulating lamina can be polyurethane foam in most instances.

In order to supply the test equipment within the chamber, it is usually necessary to provide conduits for electricity, gas, or other materials. These conduits are admitted through passages in the floor frame which are preferably defined by flexible sleeves equipped with drawstrings which can be gathered together around the conduits after installation, and thus maintain a seal around them.

DESCRIPTION OF THE DRAWINGS

The several features of the invention will be analyzed in detail through a discussion of the embodiment illustrated in the accompanying drawings. In the drawings:

FIG. 4 is a side elevation showing the installed relationship of the floor unit, the vibrating device, and the adjacent chamber structure.

FIG. 5 is a sectional elevation on an enlarged scale showing the preferred form of the conduit passage construction.

FIG. 6 shows an installed conduit, with the drawstring of the passage sleeve constricted around it for sealing.

DESCRIPTION OF THE PREFERRED EMBODIMENT

Figure 1:
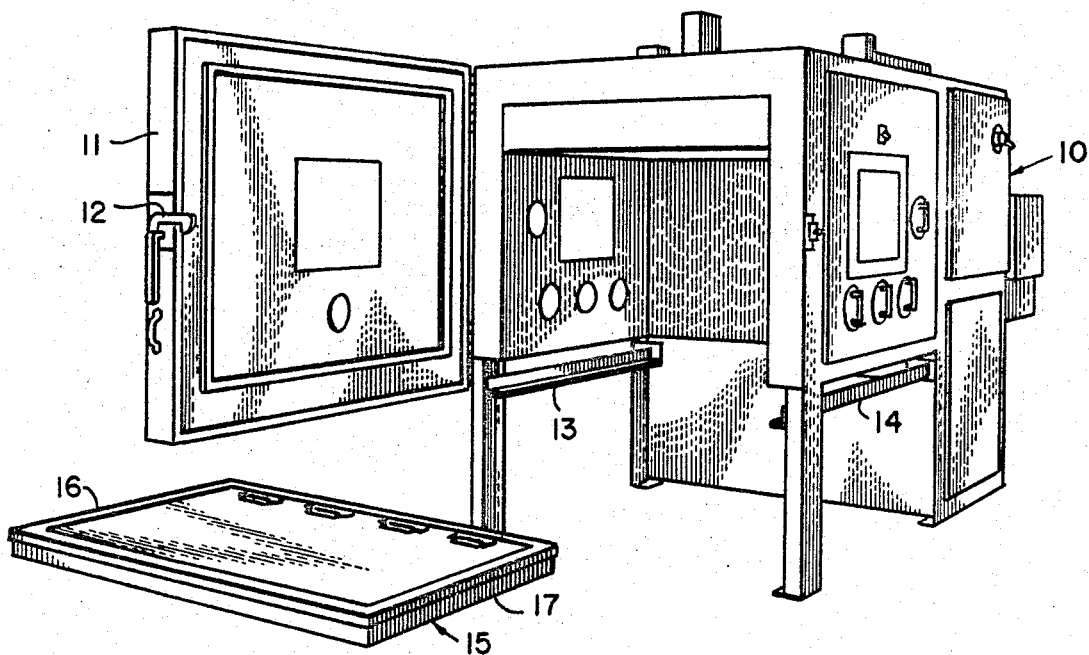
FIG. 1 is a perspective view showing a test chamber with the floor unit removed.
Figure 2:
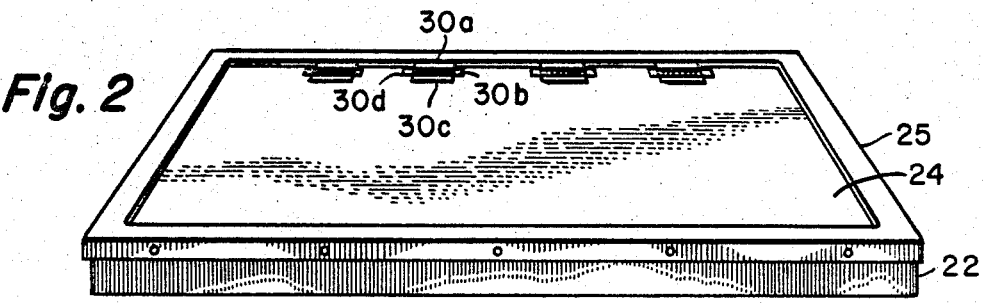
FIG. 2 is a perspective view of the floor unit, from above, on an enlarged scale.
Figure 3:
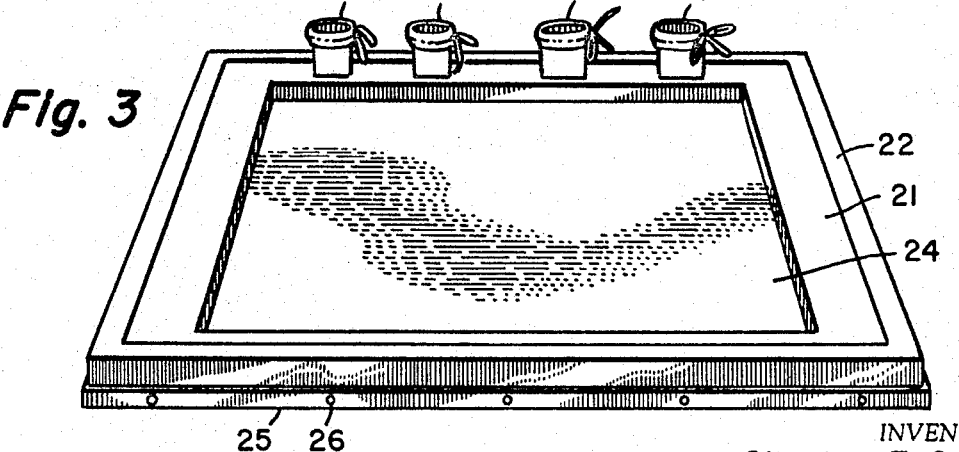
FIG. 3 is a perspective view of the unit shown in FIG. 2, from below.

The test chamber generally indicated at 10 in FIG. 1 has a hinged door 11 defining what amounts to one side of the test enclosure. This door may be swung to the right to closed position, as viewed in FIG. 1, followed by engagement of the latch 12. The chamber structure includes the opposite angle-shaped rails 13 and 14, the horizontal flanges of which provide support for the floor unit generally indicated at 15. This unit may be slid in from the left, as viewed in FIG. 1, with the rails 13 and 14 respectively receiving the edges 16 and 17 of the floor unit. After this unit has been shoved in place, auxiliary clamping devices (not shown) can be incorporated to force the floor unit 15 upwardly — preferably against a suitable perpheral gasket — for obtaining the best possible seal closing off the interior of the test chamber against leakage. The horizontal orientation of the rails 13 and 14, and the fact that the door 11 swings open to a sufficient degree to completely expose the side of the test chamber, make it possible to install the floor unit 15 as it rests on top of the conventional vibration-generating unit 18 in the manner shown in FIG. 4. The seal between the floor unit and the adjacent portions of the chamber structure may be affected around the periphery of the top of the floor unit, at the vertical faces defining the edge of the floor unit, or a combination of these. In FIG. 4, the door 11 closes against the edge of the floor unit 15, and the remainder of the chamber is sealed to the floor unit around the top surface of the floor unit through standard suitable clamping devices (not shown). It is conceivable that a sufficiently close dimensional relationship may exist between the height of the vibrating unit 18, the thickness of the floor unit 15, and the position of the lower edge 19 of the chamber structure above the floor 20 to permit the unit to merely be rolled into place without auxiliary clamping devices for producing a sealed relationship.

The structure of the floor unit is best shown in FIGS. 5 and 6. A rectangular frame 21 is constructed primarily of foamed plastic material such as polyethylene, polyurethane, or polystyrene, which is used primarily for lightness and insulating characteristics. The frame 21 is preferably reinforced by a metal channel 22, and the opening 23 defined by the frame 21 is covered by the flexible diaphragm 24. This diaphragm may be of fiberglass cloth impregnated with silicone rubber, or other similar materials which are highly flexible, and provide a vapor-tight seal under the particular conditions encountered during the test project. In the construction illustrated in FIG. 5, the diaphragm 24 is a single sheet secured to the frame by the clamping angle 25 held in position by the fastenings 26. A gasket 27 of standard material is interposed between the top surface of the floor unit 15 and the underside of the wall of the chamber structure 10.

One or more vertical passages are formed in the material of the frame 21, and these are traversed by flexible sleeves as shown at 28–31 to provide sealable passages for receiving conduits as shown at 32 in FIG. 6. These sleeves may be of the same sort of flexible material as the diaphragm 24, and the preferred form has a surrounding tubular portion 33 at the lower end for receiving a drawstring 34. The sleeves are secured on the inside by sealing the flaps 30 a–c to the diaphragm 24 with adhesive. After the conduit 32 has been installed for the supply of the equipment being tested, the drawstring 34 can be pulled together tightly to seal off the interior of the chamber against leakage. If desired, this form of seal may be supplemented (or replaced) by stuffing the passage in the frame 21 with foam or potting material around the installed conduit.

The supporting panel forming the table-like surface of the top of the vibration generator 18 may be of any desired material. FIG. 4 shows the use of a laminate supporting surface 35, but this forms no part of the present invention. The frame 21 surrounds the supporting panel 35, but there should be sufficient clearance between the periphery of the panel 35 and the frame 21 to permit the vibrations to be generated without transmitting them directly over to the frame 21. Vertical movement, of course, is transmitted directly upwardly through the flexible diaphragm, and requires very little side clearance.

The particular embodiments of the present invention which have been illustrated and discussed herein are for illustrative purposes only and are not to be considered as a limitation upon the scope of the appended claims. In these claims, it is our intent to claim the entire invention disclosed herein, except as we are limited by the prior art.

We claim:

1. A test chamber including an enclosure structure with a floor having a flexible sealing diaphragm, in combination with a vibrating unit disposed below said diaphragm and adapted to transmit vibrations through said diaphragm to articles within said enclosure structure, wherein the improvement comprises:
   a frame defining an opening in said floor normally receiving a support portion of said vibrating unit, said diaphragm extending across said opening and being supported at least in part on said support portion, said frame having at least one conduit passage normally receiving sealing means surrounding conduit means traversing said passage.

2. A test chamber as defined in claim 1, wherein said sealing means is a flexible sleeve in alignment with said passage.

3. A test chamber as defined in claim 2, wherein said sleeve traverses said passage, and includes constricting means exteriorly of said passage.

4. A test chamber as defined in claim 1, wherein said enclosure structure includes door means in a side thereof, and guideways substantially normal to the plane of the opening covered by said door means, said guideways receiving opposite edges of said frame.

5. A test chamber as defined in claim 4, wherein said guideways are horizontal, and said floor frame is engageable and disengageable horizontally through the opening defined by the open position of said door means, said floor frame being in closely fitting relationship with the surrounding structure of said enclosure in the closed position of said door.

6. A test chamber as defined in claim 1, wherein said frame is constructed of reinforced insulating material, and normally surrounds the support portion of said vibrating unit.

7. A test chamber as defined in claim 1, wherein said diaphragm is a laminate including sealing and insulating laminae.

8. A test chamber as defined in claim 1, wherein said frame defines the entire bottom of said enclosure structure.

9. A test chamber including an enclosure structure with a floor having a flexible sealing diaphragm, in combination with a vibrating unit disposed below said diaphragm and adapted to transmit vibrations through said diaphragm to articles within said enclosure structure, wherein the improvement comprises:
   a frame defining an opening in said floor normally receiving a support portion of said vibrating unit, said diaphragm extending across said opening and being supported at least in part on said support portion; and
   door means in a side of said enclosure structure, said enclosure structure also having guideways substantially normal to the plane of the opening covered by said door means, said guideways receiving opposite edges of said frame.

10. A test chamber as defined in claim 9, wherein said guideways are horizontal, and said floor frame is engageable and disengageable horizontally through the opening defined by the open position of said door means.

* * * * *